US012712677B2

(12) United States Patent
Wen et al.

(10) Patent No.: US 12,712,677 B2
(45) Date of Patent: Aug. 18, 2026

(54) SCHEDULING REPORT IN NON-TERRESTRIAL NETWORKS

(71) Applicant: Nokia Technologies Oy, Espoo (FI)

(72) Inventors: Pingping Wen, Shanghai (CN); Mads Lauridsen, Aalborg (DK); Ping Yuan, Beijing (CN); Frank Frederiksen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 261 days.

(21) Appl. No.: 18/555,651

(22) PCT Filed: May 18, 2021

(86) PCT No.: PCT/CN2021/094440

§ 371 (c)(1),
(2) Date: Oct. 16, 2023

(87) PCT Pub. No.: WO2022/241653

PCT Pub. Date: Nov. 24, 2022

(65) Prior Publication Data

US 2024/0204922 A1 Jun. 20, 2024

(51) Int. Cl.
*H04L 1/1829* (2023.01)
*H04L 1/1867* (2023.01)

(52) U.S. Cl.
CPC .......... *H04L 1/1854* (2013.01); *H04L 1/1896* (2013.01)

(58) Field of Classification Search
CPC ... H04L 1/1854; H04L 1/1896; H04L 1/1671; H04L 1/1685; H04L 1/1822; H04L 1/1864
See application file for complete search history.

(56) References Cited

U.S. PATENT DOCUMENTS

2020/0067680 A1 2/2020 Nayeb Nazar et al.
2020/0106564 A1 4/2020 Rungta et al.
(Continued)

FOREIGN PATENT DOCUMENTS

CN 110463236 A 11/2019
CN 112204908 A 1/2021
(Continued)

OTHER PUBLICATIONS

"3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17)", 3GPP TR 36.763, V0.1.0, Mar. 2021, pp. 1-29.
(Continued)

*Primary Examiner* — Abdullahi Ahmed
(74) *Attorney, Agent, or Firm* — Brake Hughes Bellermann LLP

(57) ABSTRACT

This disclosure presents solutions for a IoT/eMTC over NTN communication system of a non-terrestrial network (NTN) node and a user equipment (UE) to determine whether and how scheduling information can be sent in the resources for a HARQ feedback, when the HARQ feedback is disabled. In some example embodiments, the UE can signal a buffer size. e.g., buffer status, by encoding the HARQ feedback and scheduling request (SR) utilizing two bits to provide the fast scheduling information. The NTN node can specify to the UE a set of HARQ parameters to provide an indication of HARQ feedback status, which can be disabling or enabling of HARQ feedback, and to provide an indication of the resources for transmission of HARQ feedback when the indication of HARQ feedback status is disabling.

20 Claims, 5 Drawing Sheets

(56) References Cited

U.S. PATENT DOCUMENTS

| | | | | |
|---|---|---|---|---|
| 2020/0236670 | A1 | 7/2020 | Xiong et al. | |
| 2020/0367095 | A1* | 11/2020 | Pan | H04W 72/20 |
| 2021/0092732 | A1* | 3/2021 | Lee | H04L 1/1607 |
| 2022/0321266 | A1* | 10/2022 | Awoniyi-Oteri | H04W 72/1273 |
| 2022/0338240 | A1* | 10/2022 | Wen | H04L 1/1812 |
| 2022/0394680 | A1* | 12/2022 | Kim | H04L 1/1893 |
| 2024/0163907 | A1* | 5/2024 | Shin | H04W 76/14 |
| 2025/0141605 | A1* | 5/2025 | Yan | H04L 1/1887 |

FOREIGN PATENT DOCUMENTS

| | | |
|---|---|---|
| WO | 2021/030561 A1 | 2/2021 |
| WO | 2021/071245 A1 | 4/2021 |
| WO | 2021/072658 A1 | 4/2021 |

OTHER PUBLICATIONS

"3rd Generation Partnership Project; Technical Specification Group Radio Access Network; Evolved Universal Terrestrial Radio Access (E-UTRA); Physical layer procedures (Release 16)", 3GPP TS 36.213, V16.5.0, Mar. 2021, 578 pages.

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321, V15.11.0, Dec. 2020, pp. 1-134.

"3rd Generation Partnership Project; Technical Specification Group Radio Access Network; Evolved Universal Terrestrial Radio Access (E-UTRA): Radio Resource Control (RRC); Protocol specification (Release 15)", 3GPP TS 36.331, V15.13.0, Mar. 2021, pp. 1-966.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"Third Generation Partnership Project (3GPP™)", 3GPP TSG RAN meeting #87e, RP-200478, Meeting Report for TSG RAN meeting #86, Mar. 16-19, 2020, pp. 1-217.

"New Study WID on NB-IoT/eTMC support for NTN", 3GPP TSG RAN Meeting #86, RP-193235, Agenda: xxx, MediaTek Inc, Dec. 9-31, 2019, 4 pages.

"3rd Generation Partnership Project; Technical Specification Group Radio Access Network; Study on New Radio (NR) to support non terrestrial networks (Release 15)", 3GPP TR 38.811, V15.0.0, Jun. 2018, pp. 1-118.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.5.0, Mar. 2021, pp. 1-391.

"3rd Generation Partnership Project; Technical Specification Group Radio Access Network; Evolved Universal Terrestrial Radio Access (E-UTRA); Physical channels and modulation (Release 16)", 3GPP TS 36.211, V16.5.0, Mar. 2021, pp. 1-248.

"Study WID on NB-IoT/eTMC support for NTN", 3GPP TSG RAN Meeting #91, RP-210868, Agenda: 10.6.1, MediaTek Inc, Mar. 16-26, 2021, 4 pages.

"Discussion on scheduling request for multiple service requirements", 3GPP TSG RAN WG1 Meeting #89, R1-1707654, Agenda: 7.1.3.3.2, LG Electronics, May 15-19, 2017, 4 pages.

"Dynamic scheduling based transmission for URLLC", 3GPP TSG-RAN WG1#88bis, R1-1705245, Agenda: 8.1.3.3.4, Nokia, Apr. 3-7, 2017, 5 pages.

"3rd Generation Partnership Project; Technical Specification Group Radio Access Network; Evolved Universal Terrestrial Radio Access (E-UTRA); Radio Link Control (RLC) protocol specification (Release 16)", 3GPP TS 36.322, V16.0.0, Jul. 2020, pp. 1-47.

"3rd Generation Partnership Project; Technical Specification Group Radio Access Network; Evolved Universal Terrestrial Radio Access (E-UTRA); Packet Data Convergence Protocol (PDCP) specification (Release 16)", 3GPP TS 36.323, V16.3.0, Dec. 2020, pp. 1-56.

"3rd Generation Partnership Project; Technical Specification Group Radio Access Network; NR; Packet Data Convergence Protocol (PDCP) specification (Release 16)", 3GPP TS 38.323, V16.3.0, Mar. 2021, pp. 1-40.

International Search Report and Written Opinion received for corresponding Patent Cooperation Treaty Application No. PCT/CN2021/094440, dated Jan. 25, 2022, 10 pages.

"Discussion on DRX and BSR in NTN", 3GPP TSG-RAN WG2 Meeting #111 electronic, R2-2006799, Agenda: 8.10.2.1, Panasonic, Aug. 17-28, 2020, 5 pages.

* cited by examiner

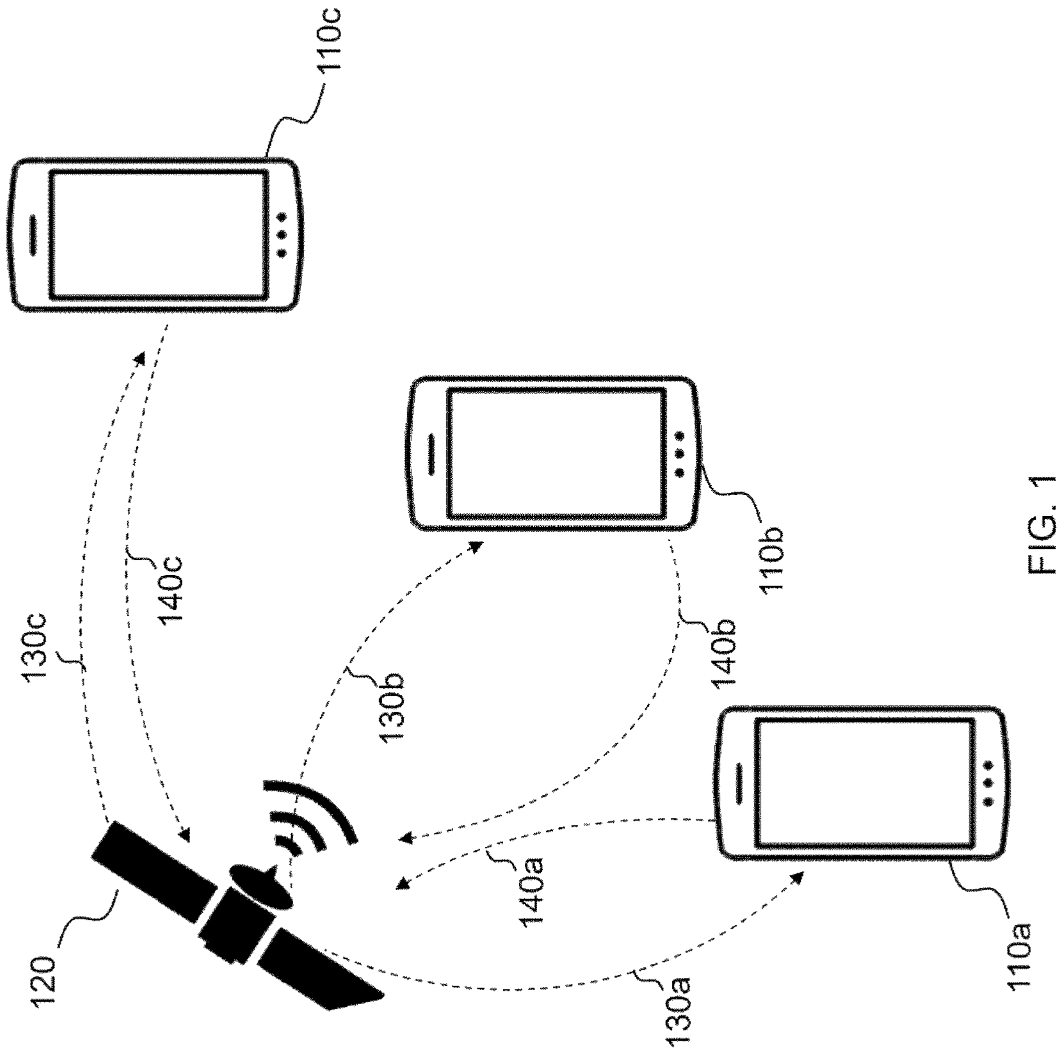
FIG. 1

SCHEDULING REPORT IN NON-TERRESTRIAL NETWORKS

RELATED APPLICATION

This application was originally filed as a Patent Cooperation Treaty Application No. PCT/CN2021/094440, filed on May 18, 2021, which is hereby incorporated in its entirety.

TECHNICAL FIELD

This application is directed, in general, to user equipment uplink data transmissions and, more specifically, to signalling a scheduling information report.

BACKGROUND

3GPP has agreed a study item on NB-IOT/eMTC support for non-terrestrial Network (NTN) to provide IoT operation in remote areas with low/no cellular connectivity for many different industries, such as transportation (maritime, road, rail, air) and logistics, solar, oil and gas harvesting, utilities, farming, environment monitoring, and mining. Satellite NB-IOT or eMTC can be used in a complementary manner to terrestrial deployments where satellite connectivity can provide coverage beyond terrestrial deployments. In NTN systems, there may be long communication delays due to the distance between the UE and the NTN node. One enhancement on HARQ in NR NTN is to disable HARQ feedback to avoid the throughput reduction due to HARQ stalling and reduce the latency due to the retransmission. RANI is also studying to support HARQ disabling for NB-IOT over NTN. In addition, fast UL scheduling and scheduling information reporting should be considered due to the long RTT in NTN. How to enhance the UL scheduling is a topic in NR NTN, e.g., UE reporting BSR via 2-step RACH. The solution in NR NTN cannot be re-used for IOT NTN. The solution for IOT NTN should be proposed to reduce the latency on UL scheduling and UL transmission for IoT service without incurring more resource.

SUMMARY

In one example embodiment, an apparatus is disclosed. The apparatus comprises (1) one or more processors, and (2) memory storing instructions and data that, when executed by the one or more processors, cause the apparatus to: (1) receive hybrid automatic repeat request (HARQ) parameters, and (2) determine a signalling scheme for a scheduling information utilizing the HARQ parameters, wherein the HARQ parameters include an indication of a HARQ feedback status of a HARQ feedback and an indication of resources for a transmission of the HARQ feedback when the indication of the HARQ feedback status is disabling, the HARQ parameters are received from a non-terrestrial network (NTN) node, and the scheduling information includes information from one or more of a scheduling request (SR) or a buffer status report (BSR).

In a second example embodiment, an apparatus is disclosed. The apparatus comprises (1) one or more processors, and (2) memory storing instructions and data that, when executed by the one or more processors, cause the apparatus to: (1) determine a number of resources allocated to a user equipment (UE), and (2) transmit HARQ parameters to the UE, wherein the HARQ parameters include an indication of a HARQ feedback status of a HARQ feedback and an indication of resources for a transmission of the HARQ feedback when the indication of the HARQ feedback status is disabling.

In a third example embodiment, a method is disclosed. The method comprises (1) receiving HARQ parameters, and (2) determining a signalling scheme for a scheduling information utilizing the HARQ parameters, wherein the HARQ parameters include an indication of a HARQ feedback status of a HARQ feedback and an indication of resources for a transmission of the HARQ feedback when the indication of the HARQ feedback status is disabling, the HARQ parameters are received from a NTN node, and the scheduling information includes information from one or more of a SR or a BSR.

In a fourth example embodiment, a method is disclosed. The method comprises (1) determining a number of resources allocated to a UE, and (2) transmitting HARQ parameters to the UE, wherein the HARQ parameters include an indication of a HARQ feedback status of a HARQ acknowledgement feedback and an indication of resources for a transmission of the HARQ feedback when the indication of the HARQ feedback status is disabling.

In a fifth example embodiment, a system is disclosed. The system comprises (1) a NTN node, capable to transceive communications and to determine HARQ parameters, and (2) a UE, capable to transceive communications with the NTN node and to transmit a scheduling information utilizing a signalling scheme for the scheduling information encoded utilizing a HARQ feedback using the HARQ parameters, wherein the HARQ parameters include an indication of a HARQ feedback status of the HARQ feedback and an indication of resources for the transmission of the HARQ feedback when the indication of the HARQ feedback status is disabling, and the scheduling information includes information from one or more of a SR or a BSR.

BRIEF DESCRIPTION

Reference is now made to the following descriptions taken in conjunction with the accompanying drawings, in which:

FIG. 1 is an illustration of a diagram of an example communication scenario with a non-terrestrial network (NTN) node and multiple user equipment (UEs);

DETAILED DESCRIPTION

Figure 2:
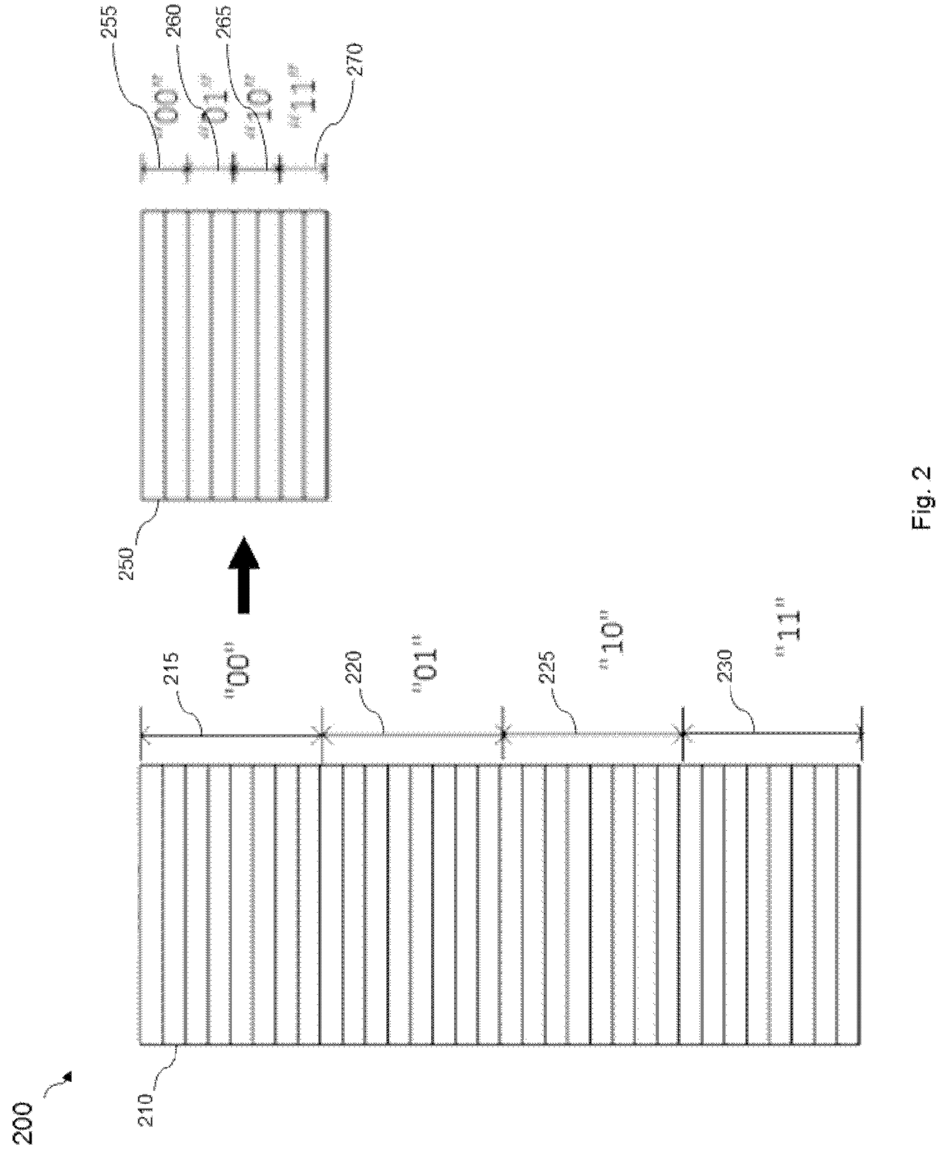
FIG. 2 is an illustration of a diagram of an example encoding of a buffer status report (BSR) table.

In the 5G third-generation partnership project (3GPP) Release 17 proposed standard, there are study items (RP-200478 and RP-193235) entitled "SI for NB-IOT/eMTC over NTN" to evaluate and confirm solutions to address the minimum necessary specifications for NB-IOT and eMTC over NTN. The accepted solutions for these study items can be reflected in various 3GPP sections, for example, TS 36.321, TS 36.331, TS 36.2131, and TR 36.763. The UE is capable to transceive, e.g., transmit and receive, communications with one or more nodes of the NTN.

UEs, such as mobile phones, tablets, laptops, and other 5G devices whether movable, mobile, or stationary, can establish a communication link with one or more network devices, i.e., NTN nodes. For example, various NTN nodes can be a communication node, such as radio access network (RAN) such as a 5G base station (gNB), an evolved universal mobile telecommunications system (UMTS), a terrestrial radio access (E-UTRA), an enhanced 4G eNodeB E-UTRA base station (eNB), e.g., an enhanced Node B, an enhanced gNB (en-gNB), or a next generation eNB (ng-eNB). The NTN node can be implemented using various non-terrestrial systems, for example, balloons, airplanes, satellites, and other non-terrestrial based systems.

Under existing procedures, the UE may need to report a buffer status report (BSR) on a narrowband physical uplink shared channel (NPUSCH) to an NTN node to let the NTN node know how much data is waiting for scheduling and transmission. If the UE does not have existing uplink resources for transmitting the BSR, the UE will trigger a SR to ask for resources for BSR transmission. In 3GPP REL 13/14 the UE can send a SR as a message on higher layers. This may result in the UE triggering a random-access procedure to request uplink (UL) resources. Considering the potential for long delays when communicating with an NTN node, where the propagation distances can be significantly larger than the propagation distances between the UE and a ground-based communication node. For example, in a case where the satellite is a regenerative geostationary earth orbit (GEO) satellite with an altitude of 35,786 kilometers (km), a distance between the GEO satellite and the UE at the nadir point is 35,786 km and a one-way propagation delay can be 119.286 milliseconds (ms). In the communication system using a low-earth orbit (LEO) satellite at 600 km altitude, the maximum delay can be 6,440 10-degree elevation angle. Large number of users can be supported within one cell which can cause inefficiencies in the usage of random-access to obtain resources for BSR. The inefficiency can increase power consumption of the UE, delay signalling responses, and other inefficiencies.

Physical layer SR was introduced in 3GPP REL-15 for NTN to achieve further latency and power reduction as well as supporting more diversified types of traffic. SR may be transmitted with hybrid automatic repeat request (HARQ) acknowledgement (ACK) or HARQ not-acknowledged (NACK) corresponding to received narrowband physical downlink shared channel (NPDSCH) or dedicated and pre-configured narrowband physical random-access channel (PRACH) (NPRACH) resources.

Resources for SR can be assigned and revoked through radio resource control (RRC) signalling. When the SR is triggered, if the medium access control (MAC) entity has a valid resource for SR together with an acknowledgement of the data in the current transmission time interval (TTI), the UE can instruct the physical layer to signal the SR together with an acknowledgement of the data, else the UE can instruct the physical layer to signal the SR on one valid NPRACH resource for SR if a valid NPRACH resource for SR is configured in the TTI. If there is not a valid NPRACH resource for SR configured in a configured TTI, the UE can initiate a random-access procedure. If the SR is transmitted with a HARQ ACK/NACK signal, the SR can be indicated using two orthogonal length-16 cover codes on the ACK/NACK data symbols. The 16 bits code of [1 1 1 1 1] can be used to signal SR off and the 16 bits code of [1 −1 1−1 1−1 1−1 1-1] can be used to signal SR on.

One enhancement on HARQ in new radio (NR) NTN can be to disable HARQ feedback to avoid the throughput reduction due to HARQ stalling, and reduce the latency due to the retransmission. RANI is reviewing the support for HARQ disabling for narrowband-internet of things (NB-IOT) over NTN. If HARQ feedback disabling is supported, there may be issues on the SR transmission, which is typically combined with the HARQ ACK/NACK signal, since there is no HARQ feedback. The current procedure specifies that the UE will transmit the SR with dedicated NPRACH resources for SR or initiate a random-access procedure for SR if there is no HARQ ACK/NACK. In NTN systems, the cell coverage is large, as compared to ground-based communication nodes, and therefore a large number of UEs can be supported in one cell. The NPRACH capacity can be limited so SR use should be limited or avoided.

In TS 36.321, the BSR is specified as having MAC control elements as a short BSR using a truncated BSR format, for example, one logical channel group (LCG) identification (ID) field and one corresponding buffer size field, and a long BSR format, for example, four buffer size fields, corresponding to LCG IDs #0 through #3. The BSR formats are identified by MAC protocol data unit (PDU) sub-headers with logical channel IDs (LCIDs) as specified in table 6

The field LCG ID is defined as the field to identify the group of logical channel(s) for which the buffer size is being reported. The length of the field is 2 bits. For NB-IOT, the LCG ID is set to #0. The field buffer size is defined as the field to identify the total amount of data available across all logical channels of a LCG after all MAC PDUs for the TTI have been built. The amount of data is indicated in the number of bytes. It includes data that is available for transmission in the radio link control (RLC) layer and in the packet data convergence protocol (PDCP) layer. The definition of what data is considered as available for transmission is specified in TS 36.322 and TS 36.323 or TS 38.323 respectively. The size of the RLC and MAC headers are not considered in the buffer size computation. The length of this field is 6 bits. If extendedBSR-Sizes is not configured, the values taken by the buffer size field are assigned using Table 6.1.3.1-1. If extendedBSR-Sizes is configured, the values taken by the buffer size field are assigned using Table 6.1.3.1-2.

In this disclosure, solutions are presented to improve the timeliness of sending SR/BSR, e.g., utilizing a signalling scheme for a scheduling information, to reduce the latency and power consumption at the UE as well as to limit the usage of PRACH resources when HARQ feedback is disabled for NB-IOT over NTN. The disclosed solutions enable sending SR/BSR, using a signalling scheme for a scheduling information, through a reuse of HARQ ACK/NACK signals when HARQ feedback is disabled for NB-IOT over NTN. The proposed solutions can utilize available HARQ feedback resources, such as resources for a transmission of the HARQ feedback, which would otherwise not be utilized due to the disabled HARQ feedback. Other benefits can include that the faster received BSR can reduce the latency for UL scheduling and UL transmission.

In some example embodiments, for the HARQ process with HARQ feedback disabled, the NTN node can allocate the resources of NPUSCH for HARQ ACK/NACK. If the UE receives the grant on NPUSCH resources for HARQ ACK/NACK for the HARQ process with HARQ feedback disabled and the SR is triggered, the UE can send the HARQ ACK/NACK signal to the NTN node to indicate the scheduling information such as SR. The mapping between the HARQ ACK/NACK and SR can be configured or pre-defined, e.g., ACK can indicate SR is on and NACK can indicate SR is off.

In some example embodiments, the NTN node can specify to the UE whether the signalling scheme for scheduling information using a HARQ signal when HARQ feedback is disabled, is allowed, such as for HARQ ACK/NACK feedback. This specification can be communicated in a RRC signal, for example, as a downlink control information (DCI) signal or a RRCReconfiguration signal. In some example embodiments, the NTN node can specify to the UE the mapping to utilize between the HARQ ACK/NACK signal and the signalling scheme for the scheduling information, e.g., configured by the NTN node.

In some example embodiments, two-bits representing the BSR can be sent by reusing the signalling of HARQ ACK/NACK and SR when the HARQ feedback is disabled for NB-IOT over NTN. For the HARQ process with HARQ feedback disabled, the NTN node can allocate the resources of NPUSCH for HARQ ACK/NACK. If the UE receives a grant on NPUSCH resources for HARQ ACK/NACK for the HARQ process with HARQ feedback disabled, the UE can send the BSR with two bits instead of the HARQ feedback and SR to the NTN node to indicate an approximate buffer size.

The same physical layer coding for HARQ ACK/NACK and SR can be reused to indicate the approximate buffer size. The mapping between the two-bit BSR information and the legacy HARQ ACK/NACK with SR can be configured or pre-defined. For example, in some example embodiments, legacy HARQ ACK "1" and SR on with a 16-bit code of [1−1 1−1 1−1 1−1 1−1 1 −1 1−1 1−1] can be used to indicate BSR bits "00". Legacy HARQ ACK "1" and SR off with a 16-bit code [1 1 1 1 1 1 1 1 1 1 1 1] can be used to indicate BSR bits "01". Legacy HARQ NACK "0" and SR on with a 16-bit code of [1−1 1−1 1−1−11−1 1−1 1−1] can be used to indicate BSR bits "10". Legacy HARQ NACK "0" and SR off with a 16-bit code of [1 1 1 1 1 1 1 1 1 1 1 1 1 1 1 1] can be used to indicate BSR bits "11".

The existing BSR table can be used to represent the two-bit BSR. In some example embodiments, the existing BSR table can be divided into four parts so that the UE can report an approximate buffer size, e.g., to indicate a range of buffer sizes (see, for example, FIG. 2). In some example embodiments, a specified number of bits (which can be one to N number of bits) are derived from a quantity of a BSR buffer size table, and the specified number of bits indicate a part or portion of the BSR buffer size table, such as one fourth part.

In some example embodiments, if there are multiple NPUSCH resources for HARQ ACK/NACK for the HARQ process with HARQ feedback disabled in one configured time window, e.g., in the BSR report period, the buffer size can be progressively reported with increased granularity to reduce the UL scheduling latency. For example, in a first NPUSCH resource, a "00" can indicate that the first quarter of the BSR buffer size table can be used as the approximate buffer size. In a second NPUSCH resource, a "10" can indicate that the third quarter of the first quarter of the BSR buffer size table can be used as the approximate buffer size. Subsequent NPUSCH resources can be utilized to further narrow down the buffer size ranges improving subsequent signalling efficiency.

In some example embodiments, the ACK/NACK and SR can be sent as specified in the legacy scheme when the HARQ feedback is disabled for NB-IOT over NTN. For the HARQ process with HARQ feedback disabled, the NTN node can allocate the resources of NPUSCH for HARQ ACK/NACK. If the UE receives the grant on NPUSCH resources for H for the HARQ process with HARQ feedback disabled and the SR is triggered, the UE can send both the ACK/NACK and SR to the NTN node.

In some example embodiments, the NTN node can control the resource allocation of NPUSCH for HARQ ACK/NACK for the HARQ process with HARQ feedback disabled. In some example embodiments, the disclosed solutions can be applied to enhanced machine type communication (eMTC) in which the ACK/NACK and SR are transmitted in a physical uplink control channel (PUCCH).

An example, for demonstration purposes, of the messaging changes to the 3GPP standard are shown in Table 1. Other messaging changes and different messaging changes can be utilized to implement this disclosure; Table 1 is for example.

TABLE 1

Example messaging to support alternative signalling scheme for a scheduling information

| Message | Change |
|---|---|
| Message: System information, DCI, RRCReconfiguration | (Allow NTN to specify if HARQ disabled scheduling information signalling is allowed by UE) |
| HARQ ACK/NACK + SR | SR signalling with re-use HARQ ACK/NACK Simplified BSR with re-use HARQ ACK/NACK together with SR |

Turning now to the figures, FIG. 1 is an illustration of a diagram of an example communication scenario 100 with a NTN node and multiple UEs. Communication scenario 100 is a demonstration of one type of environment for this disclosure. The environment for communication scenario 100 includes a UE 110*a*, a UE 110*b*, a UE 110*c* (collectively, UEs 110), and a NTN node 120. There can be fewer or additional UEs in UEs 110. NTN node 120 can be various types of communication nodes, such as a gNB, and be implemented on one of various types of vehicles, such as a balloon, an airplane, a glider, a satellite, or other vehicle types.

An example set of downlink (DL) and UL signals are shown in communication scenario 100. At a registration time of UE, at a receipt of a RRCReconfiguration signal, or a receipt of a DCI signal, UE 110*a* can receive configuration parameters from NTN node 120 using DL 130*a*. The configuration parameters can include whether HARQ feedback is enabled or disabled, whether sending SR using the HARQ signal when HARQ feedback is disabled is allowed, or the encoding scheme used for the BSR, as well as, the resources for transmission of the HARQ feedback when the indication of HARQ feedback status is disabling. The HARQ feedback status can be disabling or enabling. Likewise, UE 110*b* can receive its configuration parameters through DL 130*b* and UE 110*c* can receive its configuration parameters through DL 130*c*, (collectively, DLs 130). The configuration parameters received by each UE in UEs 110 do not need to be the same.

At a time when a SR is to be sent from UE 110*a*, UL 140*a* can be used to send the SR parameters. The SR parameters can be sent using conventional processes, F feedback, NPUSCH, or other schemes as disclosed herein. UL 140*b* can be used to send the SR parameters for UE 110*b*, and UL 140*c* for UE 110*c* (collectively, ULs 140).

FIG. 2 is an illustration of a diagram of an example encoding 200 of a BSR table. In some example embodiments, two-bits of BSR information can be sent by reusing the signalling of HARQ ACK/NACK with SR when HARQ feedback is disabled. If the HARQ process is disabled and there will be no HARQ feedback, the NTN node may not allocate NPUSCH resources for HARQ ACK/NACK. To support fast UL scheduling and UL transmission, this example embodiment can have the NTN node allocate the resources of NPUSCH for HARQ ACK/NACK. The NPUSCH is not used to carry the HARQ feedback information and SR information, but to indicate the approximate buffer size.

The encoding can be the same as for legacy HARQ ACK/NACK and SR, with the bits having a different meaning. For example, when the bits are set as HARQ ACK and SR on, this can mean the BSR bits are set as “00”. When the bits are set as HARQ ACK and SR off, this can mean the BSR are set as “01”. When the bits are set as HARQ NACK and SR on, this can mean the BSR are set as “10”. When the bits are set as HARQ NACK and SR off, this can mean the BSR are set as “11”.

The existing BSR table, such as TS 36.321 table 6.1.3.1-1, can be used as the reference from the two-bit BSR. In some example embodiments, the existing BSR table can be divided into four parts so that the UE can report an approximate buffer size for the BSR, e.g., to indicate a range of buffer sizes. The dividing into four parts can be done evenly, approximately evenly, or using weighting logic to provide a smaller range of buffer sizes in one or two parts for the most commonly utilized buffer sizes, as determined by the NTN node. For example, if the NTN node estimates that a particular UE typically uses buffer sizes of in a certain range, the NTN node can divide the BSR table in such a way, that two of the four parts have fewer rows, e.g., a higher granularity, then the other two parts which would have a larger number of rows and a smaller granularity.

In encoding 200, a table 210 represents a BSR table specified elsewhere in the 3GPP standard, such as table 6.1.3.1-1 “Buffer size levels for BSR”. Table 210 is divided into four evenly sized parts with a first part 215 referenced by “00”, a second part 220 referenced by “01”, a third part 225 referenced by “10”, and a fourth part 230 referenced by “11”. In other example embodiments, first part 215, second part 220, third part 225, and fourth part 230 do not need to be evenly sized.

If there are multiple NPUSCH resources for HARQ ACK/NACK for the HARQ process with HARQ feedback disabled in one configured time window, e.g., in the BSR report period, the buffer size can be progressively reported with increased granularity to reduce latency. For example, for the BSR report period configured time window, NPUSCH resources for HARQ ACK/NACK for 2 HARQ processes with HARQ feedback disabled can be scheduled in 2 different TTI. The two 2-bit BSR can progressively report the buffer size with increased granularity. For example, first part 215 can be specified in the first scheduled NPUSCH. First part 215 is represented by a table 250. The second two-bit BSR can indicate a further refinement of the buffer size, such as using a first part 255, a second part 260, a third part 265, and a fourth part 270. A similar scheme can be used such that these parts can be evenly distributed, or weighted by the NTN node using information collected from the one or more UEs. For example, the second scheduled NPUSCH can specify a two-bit value of “11” so that the NTN node can better estimate the buffer size of the BSR using the smaller range of rows indicated by “11”, which is fourth part 270.

Figure 3:
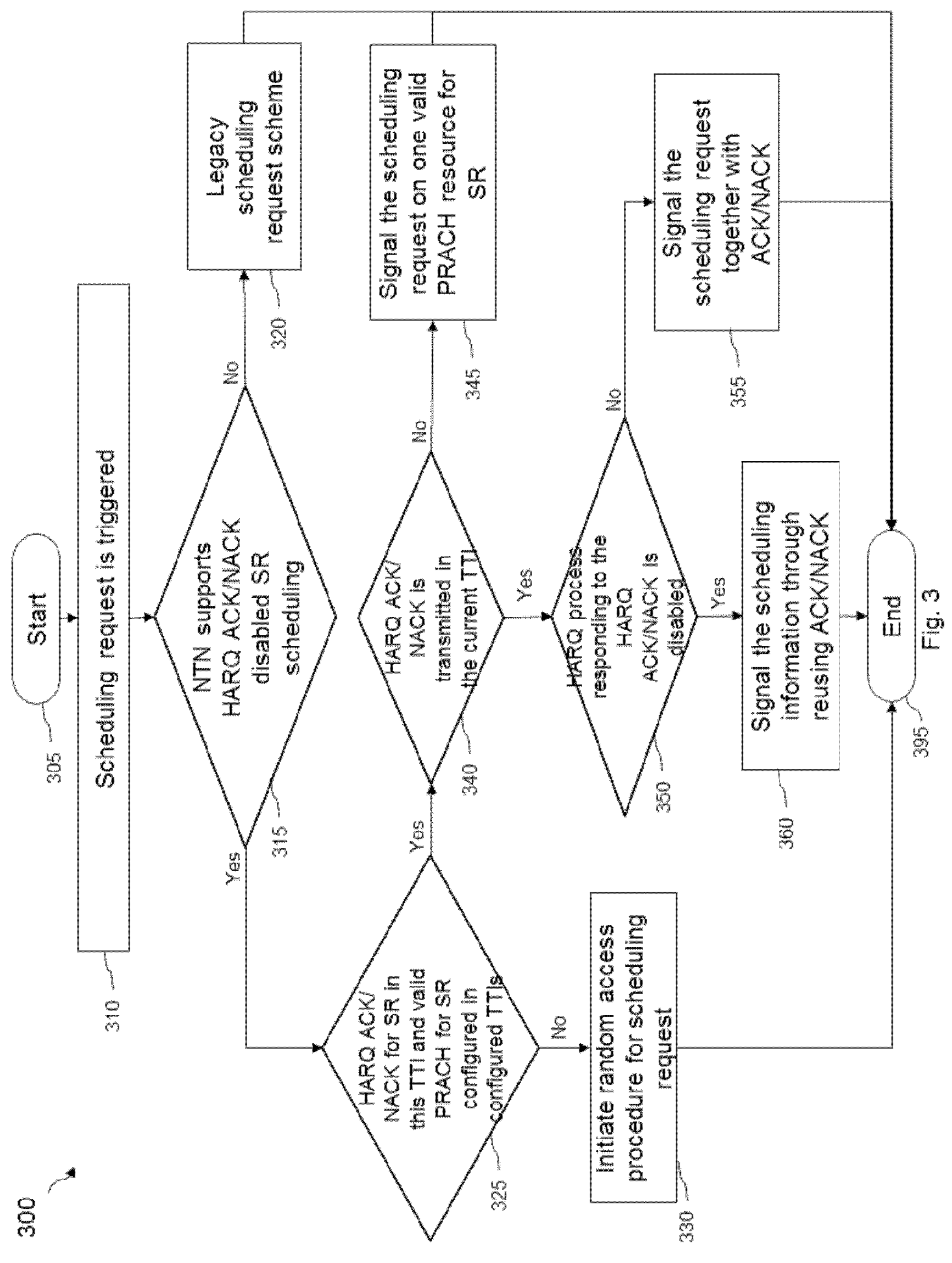
FIG. 3 is an illustration of a flow diagram of an example method to signal a scheduling information.

FIG. 3 is an illustration of a flow diagram of an example method 300 to signal a SR. Method 300 can be performed by a UE, an NTN node, or partially by a UE and partially by an NTN node. In some example embodiments, HARQ parameters can be received by the UE from the NTN node. Method 300 can be performed, for example, wholly or in part, by communication scenario 100 of FIG. 1, by communication system 400 of FIG. 4, or by HARQ controller 500 of FIG. 5.

In some example embodiments, the HARQ feedback signal, such as for HARQ ACK/NACK feedback, can be reused to indicate the SR when HARQ feedback is disabled. If the HARQ feedback is disabled and there will be no HARQ feedback, the NTN node may not allocate NPUSCH resources for HARQ feedback. To improve the response timing to the SR, the NTN node can allocate the resources of NPUSCH for HARQ feedback. This resource is not used to carry the feedback information. This resource is used to carry the SR. The encoding is the same as the encoding for legacy HARQ feedback with the bits having different meaning, e.g., ACK indicates the SR is on and NACK indicates the SR is off. The mapping between the HARQ ACK/NACK and SR can be configured or pre-defined, such as specified by the NTN node, a network system, the UE, or a default configuration can be utilized.

In scenarios where the HARQ process with HARQ feedback is enabled, the HARQ feedback can be encoded with the SR. The SR on/off can be carried by two orthogonal length 16 cover codes on ACK/NACK data symbols, such as for HARQ ACK/NACK feedback.

Different types of services can have a different frequency for triggering a SR. Therefore the NTN node can control the resource allocation of NPUSCH for HARQ feedback on the HARQ process with HARQ feedback disabled. The NTN node can determine whether to allocate the NPUSCH resources for HARQ feedback considering other factors, such as whether there are NPUSCH resources for previous HARQ for HARQ feedback enabled/dis NPUSCH and the load of NPRACH, and other load factors on the NTN node. In some example embodiments, the NTN node can make a trade off determination on the resource usage and the latency on signalling scheduling information. In some example embodiments, the NTN node can specify whether the solutions presented herein are used and signal this to the UE considering the service type and other factors such as whether there is HARQ process with HARQ feedback enabled.

Method 300 begins at a step 305 and proceeds to a step 310. In step 310, the UE indicates that the UE has an SR to transmit to the NTN node. Previously, the UE has received HARQ parameters indicating whether HARQ ACK/NACK is enabled or disabled, and whether SR or BSR buffer size can be encoded in the HARQ feedback when the HARQ feedback is disabled as well as the resources for transmission of the HARQ feedback when the indication of HARQ feedback status is disabling. The HARQ feedback can be for HARQ ACK/NACK feedback.

Proceeding to a decision step 315, the UE, using the received configuration parameters, determines whether the NTN node is allowing scheduling information signalling when HARQ feedback is disabled. If the resultant is “No”, then method 300 proceeds to a step 320. If the resultant is “Yes”, method 300 proceeds to a decision step 325. In step 320, legacy SR signalling schemes, e.g., processes or algorithms, are utilized. Method 300 proceeds to a step 395.

In decision step 325, the UE can determine if there are HARQ ACK/NACK for SR in the current TTI and whether there is a valid PRACH for the SR configured in the configured TTIs (which include the current TTI). If the resultant is “No” to both parts of the decision, then method 300 proceeds to a step 330. If the resultant is "Yes" to one or both parts of the decision, then method 300 proceeds to a decision step 340. In step 330, the UE can initiate a random-access procedure for the SR. Method 300 proceeds to step 395.

In decision step 340, the UE, utilizing the analysis of decision step 325, can determine whether the HARQ ACK/NACK is being transmitted in the current TTI. If the resultant is "No", method 300 proceeds to a step 345. If the resultant is "Yes", method 300 proceeds to a decision step 350. In step 345, the UE signals the SR on one of the valid PRACH resources for SR. Method 300 proceeds to step 395.

In decision step 350, the UE determines whether the HARQ feedback is disabled by using the received configuration parameters. If the resultant is "No", method 300 proceeds to a step 355. If the resultant is "Yes", method 300 proceeds to a step 360. In step 355, the UE signals the SR together with the HARQ feedback. Method 300 proceeds to step 395.

In step 360, the UE can signal, e.g., encode, the scheduling information through reusing the HARQ feedback signal. Method 300 proceeds to step 395. In step 395 the method ends.

Figure 4:
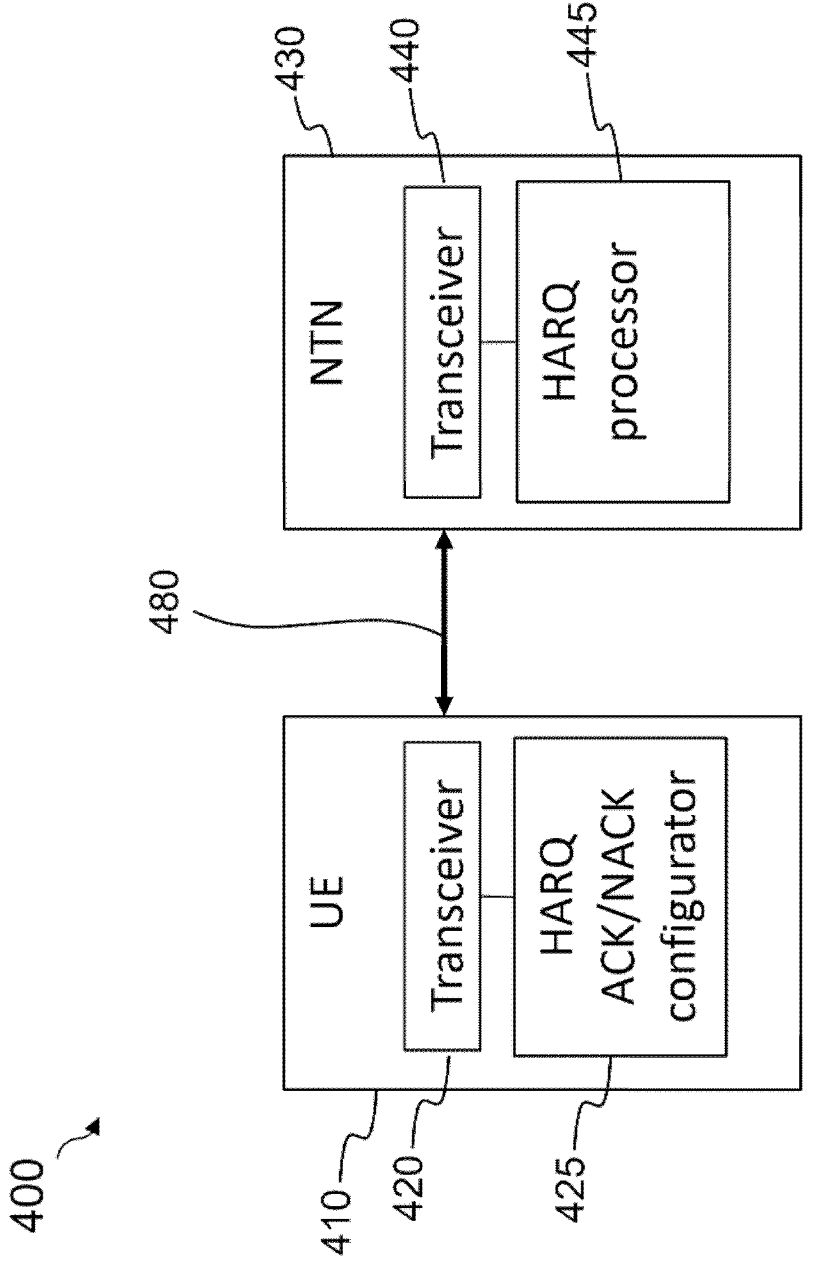
FIG. 4 is an illustration of a block diagram of an example communication system using an alternate signalling scheme for a scheduling information.

FIG. 4 is an illustration of a block diagram of an example communication system 400 using an alternate signalling scheme for a scheduling information. Communication system 400 is an example system and could have additional communication nodes and additional UEs. Communication system 400 can implement the disclosed solutions, such as method 300 of FIG. 3 and implement the HARQ controller 500 of FIG. 5. Communication system 400 has a UE 410 and an NTN node 430.

UE 410 has a transceiver 420 capable of receiving communication signals and transmitting communication signals with NTN node 430 using a signal connection 480, for example, receiving configuration parameters from NTN node 430 (for example, using a HARQ feedback status), such as allowing the disabling of HACK ARK/NACK feedback, allowing SR to be sent using the HARQ feedback signal, or allowing BSR approximate buffer size to be encoded in the HARQ feedback. Signal connection 480 can be used to transmit a SR or BSR status to NTN node 430. UE 410 has a UE HARQ ACK/NACK configurator 425, which can determine how UE 410 utilizes the received configuration parameter and builds the appropriate encoded HARQ feedback response (with or without HARQ feedback depending on the configuration parameters), random-access procedure, PRACH resource, or legacy SR scheme, for example, the utilizing the schemes described in method 300 of FIG. 3.

NTN node 430 has a transceiver 440 capable of receiving communication signals and transmitting communication signals with UE 410 using signal connection 480. Communication node 430 has a HARQ processor 445 that is capable of analyzing the received UE HARQ feedback signal, random-access procedure request, PRACH, or legacy scheduling information signalling, such as received from UE 410. HARQ processor 445 is capable of determining configuration parameters of HARQ at UE 410, such as determining a HARQ feedback status, where the status can be disabling or enabling, allowing SR to be sent using a HARQ feedback signal, allowing the use of BSR encoding in the HARQ feedback signal, and other configuration parameters. NTN node 430 can communicate the configuration parameters to UE 410 using, for example, a system information signal, an RRC signal, a DCI, or other signals.

The elements of UE 410 and NTN node 430 are shown as a functional view, where the implementation can be by software, hardware, or a combination thereof. In some aspects, the functions shown can be combined with other functions of the respective UE 410 or NTN node 430.

Figure 5:
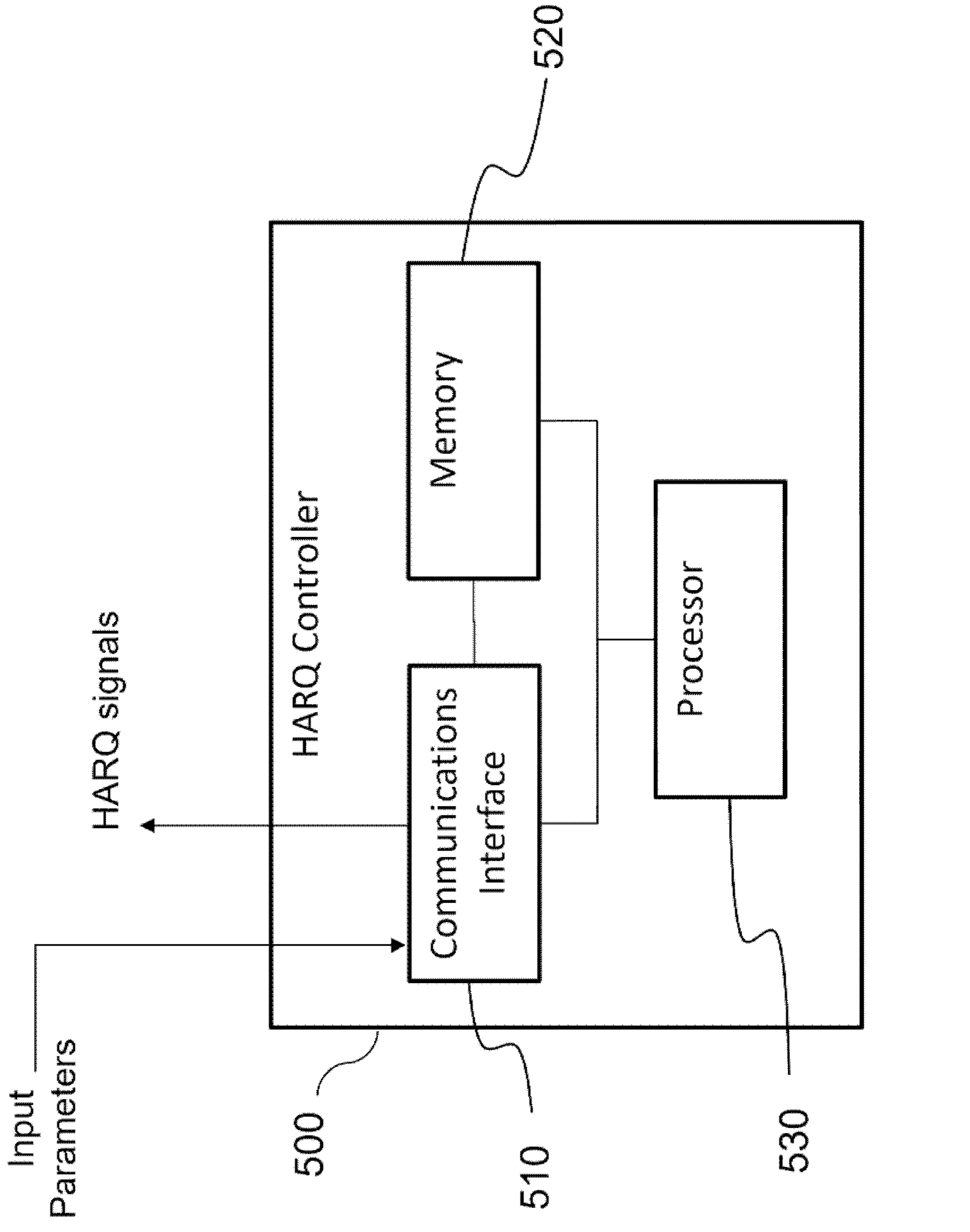
FIG. 5 is an illustration of a block diagram of an example of a HARQ controller according to the principles of the disclosure.

FIG. 5 is an illustration of a block diagram of an example of a HARQ controller 500 according to the principles of the disclosure. HARQ controller 500 can be stored on a single computer or on multiple computers. The various components of HARQ controller 500 can communicate via wireless or wired conventional connections. A portion or a whole of HARQ controller 500 can be located as part of a UE and other portions of HARQ cc located as part of a NTN node communicating with the NTN node. HARQ controller 500 can be virtual or partially virtual while hosted on another system or process.

HARQ controller 500 can be configured to perform the various functions disclosed herein including receiving NTN node HARQ parameters. The various functions performed can be an execution of the methods and processes described herein, such as method 300 of FIG. 3. HARQ controller 500 can implement communication system 400 of FIG. 4. HARQ controller 500 includes a communications interface 510, a memory 520, and a processor 530.

Communications interface 510 is configured to transmit and receive data. For example, communications interface 510 can receive the configuration parameters from an NTN node. Communications interface 510 can transmit the HARQ feedback signal, PRACH, random-access procedure request, or other legacy signalling. Communications interface 510 can communicate via communication systems used in the industry. For example, wireless or wired protocols can be used. Communication interface 510 is capable of performing the operations as described for transceiver 420 of FIG. 4.

Memory 520 can be configured to store a series of operating instructions and data, e.g., storing instructions and data, that direct the operation of processor 530 when initiated, including the code representing the schemes for encoding the appropriate HARQ feedback, such as for HARQ ACK/NACK feedback, PRACH, random-access procedures, and other legacy signals. Memory 520 is a non-transitory computer readable medium. Multiple types of memory can be used for data storage and memory 520 can be distributed.

Processor 530 can be configured to determine the appropriate encoding of the HARQ feedback, PRACH, random-access procedures, and other legacy signals utilizing the received configuration parameters. For example, processor 530 can determine at a time when a SR is need to be sent how to encode the SR request using one of the allowed schemes, such as a PRACH, a random-access procedure, or a HARQ feedback signal. Processor 530 can be configured to direct the operation of the HARQ controller 500. Processor 530 includes the logic to communicate with communications interface 510 and memory 520, and perform the functions described herein to determine the HARQ ACK/NACK encoding. Processor 530 is capable of performing or directing the operations as described by HARQ processor 445 of FIG. 4.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software programs may represent schemes and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple, or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects as described in the SUMMARY section can have one or more of the following additional elements in combination. Element 1: communicate the scheduling information to the NTN node utilizing the signalling scheme for the scheduling information. Element 2: wherein the indication of the HARQ feedback status is disabling, the resources for the transmission of the HARQ feedback is indicated, the HARQ feedback is disabled, a information is signalled by encoding the HARQ feedback. Element 3: wherein the indication of the HARQ feedback status is disabling, the resources for the transmission of the HARQ feedback is indicated, the HARQ feedback is enabled, and the scheduling information is signalled with the HARQ feedback. Element 4: wherein the indication of the HARQ feedback status is disabling, the resources for the transmission of the HARQ feedback is indicated, the HARQ feedback is disabled, and an approximate BSR buffer size is signalled by encoding the HARQ feedback and the SR utilizing a specified number of bits. Element 5: wherein the specified number of bits are derived from a quantity of a BSR buffer size table, and the specified number of bits indicate a one fourth part of the BSR buffer size table. Element 6: wherein the approximate BSR buffer size is configured with RRC signalling or SIB signalling. Element 7: wherein a number of resources for a transmission of the HARQ feedback is greater than one in a configured time window, and a subsequent BSR buffer size signalled on a subsequent resource indicates increased granularity of the BSR buffer size. Element 8: wherein the NTN node utilizes IoT, and the HARQ parameters indicate a number of NPUSCH resources. Element 9: wherein the NTN node utilizes eMTC, and the HARQ parameters indicate a number of PUCCH resources. Element 10: receive the HARQ feedback. Element 11: interpret the HARQ feedback as an indication of a scheduling report or a buffer status report, when the indication of the HARQ feedback status is disabling. Element 12: wherein the NTN node is one of a gNB, an UMTS, a E-UTRA, an eNB, an en-gNB, or a ng-eNB.

What is claimed is:

1. An apparatus, comprising:

one or more processors; and memory storing instructions and data that, when executed by the one or more processors, cause the apparatus to:

receive from a non-terrestrial network (NTN) node, hybrid automatic repeat request (HARQ) parameters, wherein the HARQ parameters comprise an indication of a HARQ feedback status of a HARQ feedback and an indication of resources for a transmission of the HARQ feedback; and determine a signalling scheme, for a scheduling information, utilizing resources associated with transmission of the HARQ feedback, in response to the indication of HARQ feedback status indicating that the HARQ feedback is disabled, wherein the scheduling information includes comprises information from one or more of a scheduling request (SR) or a buffer status report (BSR).

2. The apparatus as recited in claim 1, wherein the instructions and data further cause the apparatus to:

communicate the scheduling information to the NTN node utilizing the signalling scheme for the scheduling information.

3. The apparatus as recited in claim 1, wherein the apparatus is further caused to signal the scheduling information by encoding the HARQ feedback.

4. The apparatus as recited in claim 1, wherein the apparatus is further caused to signal the scheduling information with the HARQ feedback, in response to the indication of HARQ feedback status indicating that the HARQ feedback is enabled.

5. The apparatus as recited in claim 1, wherein the apparatus is further caused to signal an approximate BSR buffer size by encoding the HARQ feedback and the SR utilizing a specified number of bits.

6. The apparatus as recited in claim 5, wherein the specified number of bits are derived from a quantity of a BSR buffer size table, and the specified number of bits indicate a one fourth part of the BSR buffer size table.

7. The apparatus as recited in claim 5, wherein the approximate BSR buffer size is configured with RRC signalling or SIB signalling.

8. The apparatus as recited in claim 5, wherein a number of resources for a transmission of the HARQ feedback is greater than one in a configured time window, and a subsequent BSR buffer size signalled on a subsequent resource indicates increased granularity of the BSR buffer size.

9. The apparatus as recited in claim 1, wherein the HARQ parameters indicate a number of narrowband physical uplink shared channel (NPUSCH) resources.

10. The apparatus as recited in claim 1, wherein the HARQ parameters indicate a number of physical uplink control channel (PUCCH) resources.

11. An apparatus, comprising:

one or more processors; and memory storing instructions and data that, when executed by the one or more processors, cause the apparatus to:

determine a number of resources allocated to a user equipment (UE); and transmit hybrid automatic repeat request (HARQ) parameters to the UE, wherein the HARQ parameters comprise an indication of a HARQ feedback status of a HARQ feedback and an indication of resources for a transmission of the HARQ feedback when the indication of the HARQ feedback status is disabled.

12. The apparatus as recited in claim 11, wherein the instructions and data further cause the apparatus to:

receive the HARQ feedback; and interpret the HARQ feedback as an indication of a scheduling report or a buffer status report, when the indication of the HARQ feedback status is disabling.

13. A method, comprising:

receiving from a non-terrestrial network (NTN) node, hybrid automatic repeat request (HARQ) parameters, wherein the HARQ parameters comprise an indication of a HARQ feedback status of a HARQ feedback and an indication of resources for a transmission of the HARQ feedback; and determining a signalling scheme, for a scheduling information, utilizing resources associated with transmission of the HARQ feedback, in response to the indication of HARQ feedback status indicating that the HARQ feedback is disabled, wherein the scheduling information comprises information from one or more of a scheduling request (SR) or a buffer status report (BSR).

14. The method as recited in claim 13, further comprising:

communicating the SR to the NTN node utilizing the signalling scheme for the scheduling information.

15. The method as recited in claim 13, further comprising signaling the scheduling information is signalled by encoding the HARQ feedback.

16. The method as recited in claim 13, further comprising signaling the scheduling information with the HARQ feedback, in response to the indication of HARQ feedback status indicating that the HARQ feedback is enabled.

17. The method as recited in claim 13, further comprising signaling an approximate BSR buffer size by encoding the HARQ feedback and the SR utilizing a specified number of bits.

18. The method as recited in claim 17, wherein the specified number of bits are derived from a quantity of a BSR buffer size table, and the specified number of bits indicate a one fourth part of the BSR buffer size table.

19. The method as recited in claim 17, wherein the approximate BSR buffer size is configured with RRC signalling or SIB signalling.

20. The method as recited in claim 17, wherein a number of resources for a transmission of the HARQ feedback is greater than one in a configured time window, and a subsequent BSR buffer size signalled on a subsequent resource indicates increased granularity of the BSR buffer size.

* * * * *